Nov. 3, 1959     D. M. WRIGHT     2,911,068
LUBRICATING DEVICE
Filed Aug. 21, 1957
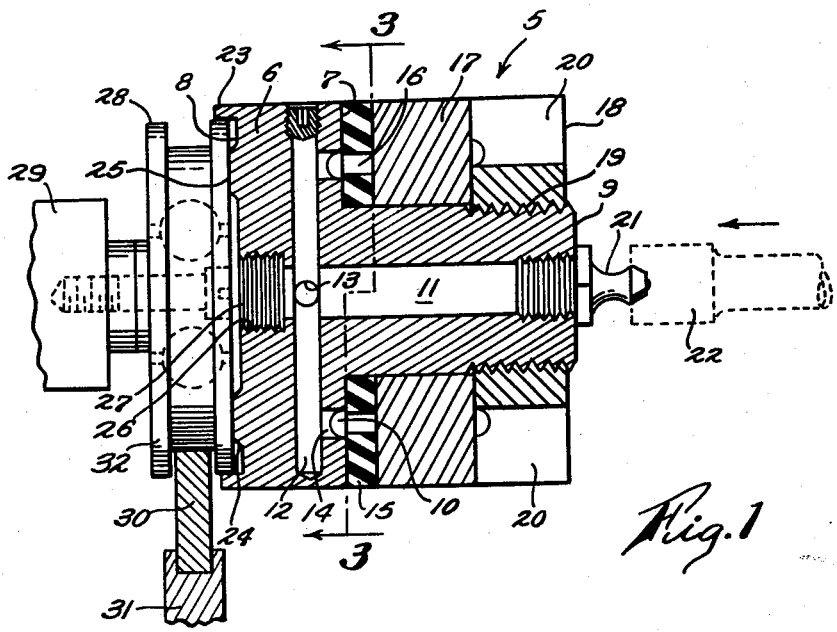
Fig. 1
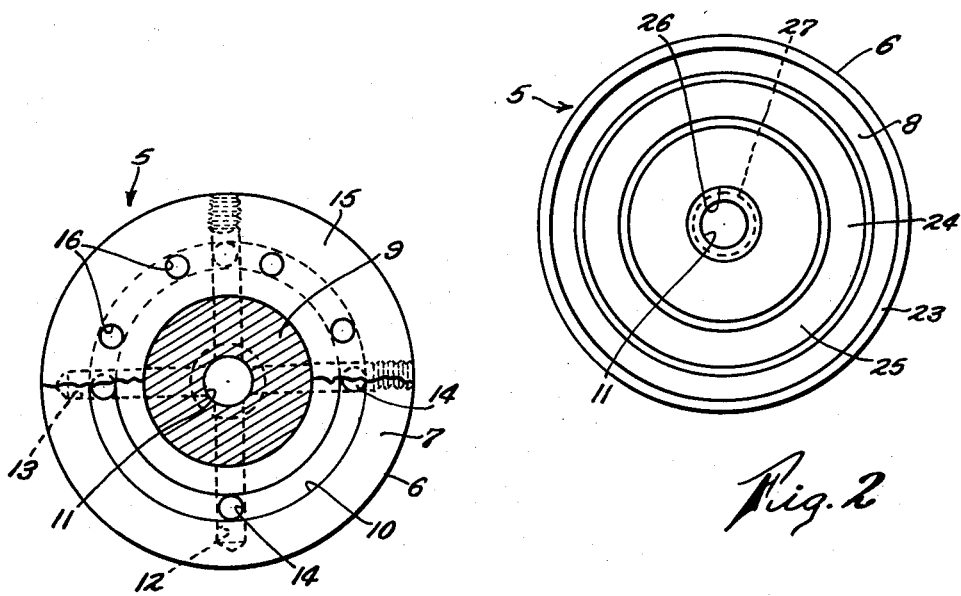
Fig. 3
Fig. 2
INVENTOR.
Daniel M. Wright
BY
Murray, Sachtoff & Murray
ATT'YS

United States Patent Office 2,911,068
Patented Nov. 3, 1959

2,911,068

LUBRICATING DEVICE

Daniel M. Wright, Cincinnati, Ohio

Application August 21, 1957, Serial No. 679,420

1 Claim. (Cl. 184—1)

The present invention relates to improvements in lubricating devices for ball bearings and is particularly directed to a machinery maintenance tool that is adapted, with a few, simple adjustments, to pack with grease both mounted sweep ball bearings and unmounted sealed or shielded ball bearings.

As is well known many machines utilize various types of frictionless bearings between their moving parts, both shielded and open bearings, and it is imperative that these bearings be serviced and greased periodically to prevent bearing failure and to insure smooth operation of the machines. The provision of a single service tool for forcing old grease from and repacking with new grease at least two types of frictionless bearings is therefore an important object of my invention.

Another object of this invention is to provide an inexpensive, yet rugged tool for lubricating mounted, sweep ball bearings.

These and other objects of the invention will be apparent from the following specification. In the accompanying drawings which illustrate the preferred embodiment of my invention:

Fig. 1 is a central section through my lubricator illustrated in position for greasing a sweep ball bearing that is shown therein in side elevation.

Fig. 2 is a plan view of the bearing engaging end of the lubricator, and:

Fig. 3 is a section taken on line 3—3 of Fig. 1.

Referring to the drawing in detail my lubricator 5 comprises a generally cylindrical base member 6 having parallel, planar end faces 7 and 8. A lubricant tube or post 9 is co-axially positioned with respect to the base member 6 and projects from the end face 7 at right angles thereto. An annular lubricant distributing recess 10 is formed in the end face 7 of the base concentric with the tube 9, said annular recess being in open communication with a central bore 11 of the tube by means of interconnecting, cross bores 12 and 13 formed in the base 6 which interstect the bore 11 and are in communication with the recess by passages 14 formed in the base between the cross bores and angularly spaced apart portions of the bottom of the annular recess 10. A ring shaped member 15, constructed of a resilient, grease resistant plastic material, surrounds the base of the tube 9 and is in face-to-face contact with the planar face 7 of the base 6. This ring shaped member 15 has a circular row of angularly spaced apart holes 16 formed therethrough in registry with the annular recess 10 formed in the base 6.

As best shown in Fig. 1 a solid spacer washer 17, preferably made of aluminum, surrounds the post 9 and is in face-to-face contact with the resilient ring shaped disc 15 to thereby effectively seal off and close all of the openings 16 formed in said disc 15. A washer hold down means is provided for my lubricator and preferably takes the form of a nut 18 co-operable with exterior threads 19 formed on the outer end of the post 9. The nut has a plurality of outwardly opening, radial grooves 20 formed therein for easy gripping of the nut when it is desired to turn it down on the post to clamp the washer 17 tightly against the resilient member 15. The usual grease nipple 21 is threaded to the outer end of the post in communication with the bore 11 for cooperation with the nozzle 22 on a conventional pressure operated grease gun.

It will therefore be understood that the structure of the device described hereinbefore may be readily used to service shielded ball bearings, it being only necessary to plug the end of the bore 11 beyond its intersection with the cross bores 12 and 13 and to then remove the washer 17 and replace it with the bearing to be packed in a manner clearly disclosed in my co-pending patent application for Lubricator for Sealed Frictionless Bearings filed June 14, 1956, and given Serial Number 591,482, now Patent No. 2,839,160, in the United States Patent Office. By exerting axially directed pressure on the nozzle 22 in the direction of the arrow in Fig. 1, grease under pressure will be forced through the bore 11, the cross bores 12 and 13 on the base, and into the annular recess 10 through the openings 14. From the recess 10 the grease under pressure is forced through the openings 16 in the resilient disc 15 and into the shielded bearing, the resilient characteristic of the member 15 sealing the space between the shield and the inner race so that all the grease under pressure enters the bearing and forces the old grease out through the other side of the bearing.

With reference to Figs. 1 and 2 it will be noted that a bearing receiving, annular flange 23 projects from the peripheral edge portion of the planar face 8 of the base member 6 at right angles to said face. An annular raised surface 24 is formed on the base member concentric with, and spaced radially inwardly from the flange 23, it being noted that the heightwise dimension of the raised surface is considerably less than the projected distance of the flange 23. The raised surface preferably has a relatively wide, planar face 25 that is in a plane normal to the axis of the base member and the post. A grease passageway 26 extends through the base member and communicates with the bore 11 in the post at a point below the intersection of the said bore with the cross bores 12 and 13. The passageway 26 is in open communication with the end face 8 of the base, the mouth of the passageway being internally threaded at 27 to receive a threaded plug for the purposes to be hereinafter set forth.

In order that the invention be clearly understood my lubricator is illustrated in Fig. 1 in its operative position relative to a sweep ball bearing 28 that is mounted on a suitable slide 29 and in rolling contact with a rail 30 mounted on a base member 31. When it is desired to lubricate this sweep ball bearing my device is manually held in the position shown in Fig. 1 wherein it will be noted that the annular raised surface 24 on the planar end face 8 of the base member is in face-to-face contact with the unobstructed face of the outer race 32 of the sweep bearing 28. As axial grease feeding pressure is exerted on the gun nozzle 22 the contact between the annular raised surface and the outer race of the sweep bearing is increased to thereby insure a tight seal between the lubricator and the sweep bearing. Grease under pressure will therefore move through the bore 11 in the post 9 and as the lubricant distributing recess 10 is closed off by the washer 17, such grease will pass through the passageway 26 out into the space bounded by the inner portion of the planar face 8, the annular raised surface 24 and the adjacent faces of the inner and outer races of the sweep bearing 28, thus forcing old grease from between said races and replacing it with new grease.

As has been set forth hereinabove my lubricator can be used to pack a shielded ball bearing it being understood that a conventional threaded plug (not shown) must be turned into the threaded passageway 26 to prevent grease under pressure from passing out through the bottom of the base, and thus insuring movement of the grease into the cross bores 12 and 13 and hence into the lubricant distributing recess 10.

What is claimed is:

A lubricating device for mounted sweep ball bearings comprising a generally cylindrical base member having a co-axially positioned lubricant inlet tube projecting from one face thereof, a co-axial grease passageway extending through the base member and communicating with the tube, an annular flange projecting from the opposite face of the base member for the reception of the outer portion of the mounted sweep roller bearing assembly having an unobstructed outside face, an annular raised surface formed on the base member concentric with, and having its outer peripheral edge spaced radially inwardly from the flange, said base surface projecting from the same face of the base member as the flange and having a height-wise dimension less than that of the flange, said raised surface also having a planar face normal to the common axis of the base and the tube for flatwise engagement against the unobstructed outside face of the outer race of the sweep bearing, and a pressurized lubricant gun connecting means connected to the free end of the tube to transmit axial force via the tube to the base when gun operating force is exerted on the connecting means whereby the raised surface will be held against the unobstructed face of the outer race of the bearing during the lubricant feeding operation of the gun.

References Cited in the file of this patent
UNITED STATES PATENTS

| | | |
|---|---|---|
| 2,369,178 | Richmond et al. | Feb. 13, 1945 |
| 2,514,799 | Rubertino et al. | July 11, 1950 |
| 2,696,276 | Burnett | Dec. 7, 1954 |

FOREIGN PATENTS

| | | |
|---|---|---|
| 271,221 | Switzerland | Jan. 16, 1951 |